Jan. 1, 1957   H. HOPFELD   2,776,080
LADDER
Filed Nov. 15, 1954
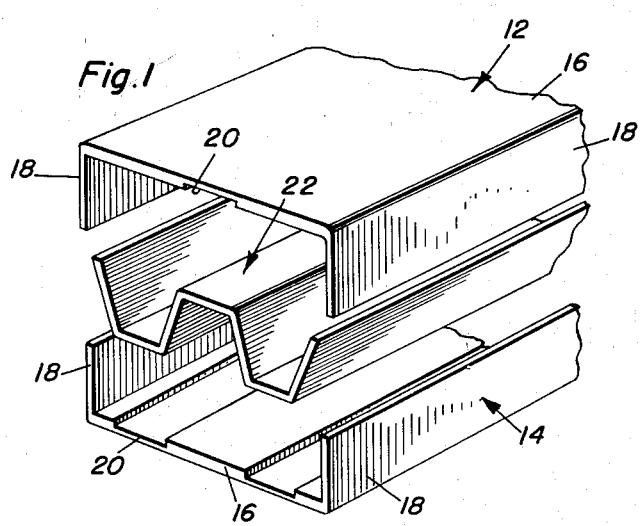
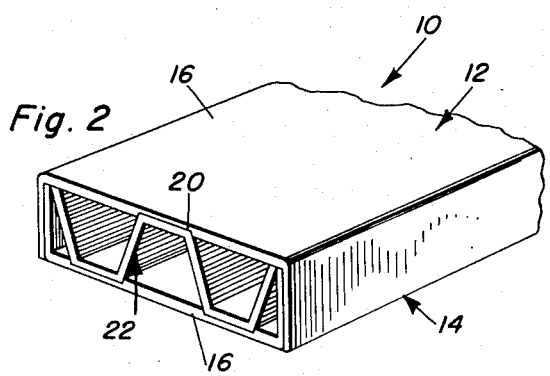
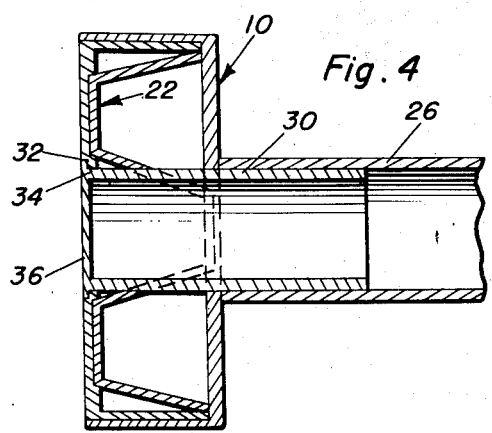
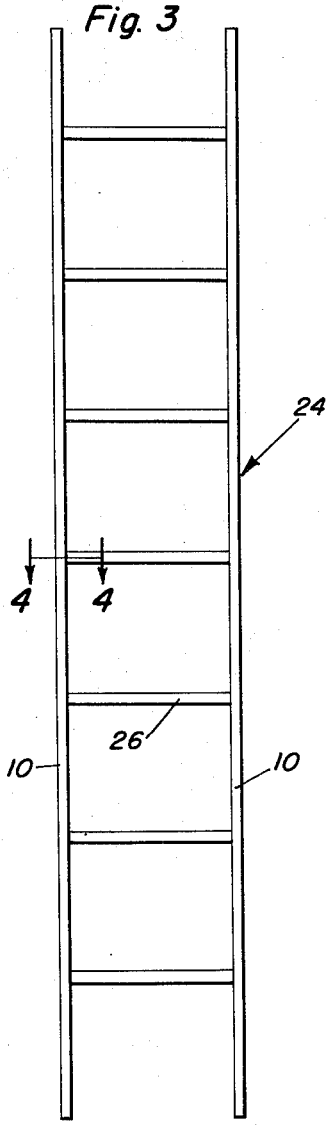
Henry Hopfeld
INVENTOR.
BY

2,776,080

LADDER

Henry Hopfeld, Ross, Calif.

Application November 15, 1954, Serial No. 468,611

3 Claims. (Cl. 228—55)

The present invention relates to ladders, and more particularly relates to a novel, light weight ladder construction.

The primary object of the present invention is to provide a ladder composed of light weight, hollow wall, plastic side rails interconnected by rungs wherein the plastic side rails are constructed in such a manner that they will withstand severe stresses without damage.

A further object of the invention is in the provision of hollow wall, plastic side rails for a ladder, which plastic side rails are provided with novel means for retaining the rungs of the ladder thereto.

A still further object of the present invention is to provide a structural element in the form of a hollow wall, laminate plastic panel, which panel, in addition to use as a side rail for ladders, may be utilized as a beam, truss, ladder reinforcement or other structural element.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is an exploded perspective view of a portion of a hollow wall panel formed in accordance with the present invention;

Figure 2 is a perspective view of a portion of a completed hollow wall panel;

Figure 3 is a front elevational view of a ladder utilizing the hollow wall panels as the side rails thereof; and Figure 4 is a cross-sectional view through a portion of the ladder taken substantially along the plane of section line 4—4 of Figure 3.

Referring now to the drawings in detail, there is shown in Figures 1 and 2 a plastic hollow wall panel designated by the numeral 10. It is to be understood that the term "plastic" as utilized in this description is meant to cover any resin, either synthetic or natural, or fiberglass-plastic laminated panel construction.

Preferably, the panels 10 are made up of laminated fiberglass, the layers of fiberglass being impregnated and bonded to one another with any suitable thermosetting, or thermoplastic resins.

The panels themselves comprise a hollow wall member composed of first and second channels 12 and 14, respectively, opposed to one another and having overlapping flanges suitably secured to one another by a glue or resin. Each of the channels 12 and 14 comprises a web 16 and channel flanges 18.

The facing surfaces of the webs 16 of the channels 12 and 14 are provided with grooves 20. A corrugated filler panel 22, preferably of the same type plastic material as the channel members 12 and 14, has the opposing flattened ridges thereof seated in the opposing flat bottom grooves 20 of opposite channels wherein they are sealed by a suitable glue or resin to form a hollow wall member, making up the completed hollow wall panel 10.

Suitable plastic reinforcing resins for the fiberglass laminae have been found to be the epoxy resins and other polyesters. Such resins also serve admirably as bonding agents for the sections of the completed hollow wall panel.

When assembled into elongated strips or members the hollow wall panels 10 provide exceedingly light weight, strong and durable side rails for ladders as shown in Figure 3.

The ladder 24 of Figure 3 is composed of spaced, parallel hollow wall panel members 12 interconnected to one another by means of ladder rungs 26.

To mount the ladder rungs 26, the side rails 10 are provided with collars 30 secured therewithin at longitudinally spaced points therealong, these collars 30 preferably extending perpendicularly from the side rails toward one another.

The rungs 26, as will be noted in Figure 4, are preferably tubular and fit over the projecting portions of the collars 30 to attach the side walls 10.

Of course, the collars 30, while not shown in the drawings, may be terminated within the hollow wall sections and suitably tapered with the rings interfitting within these collars to connect the side rails 10.

The rungs may be extruded stock, may possess serrated surfaces or be coated with an anti-friction composition or the like if desired.

Preferably in the mounting of the collars 30 within the side rails 10, the outer surfaces of the side rails are provided with recessed rims 32 surrounding the openings 34 within which the collars 30 fit.

The outer ends of the collars 30 are provided with end plates 36 which form an annular rim around the collars seating within the recessed rims 32 of the panels 10.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A plastic hollow wall panel comprising a pair of opposing channel members having their flanges overlapping and bonded to one another, the webs of said channels facing one another and having grooves in the facing surfaces thereof, a connected stiffening panel having ridges thereon secured within said grooves.

2. The combination of claim 1 wherein said ridges being flattened.

3. A fiberglass reinforced ladder comprising side rails each including a pair of opposing channel members, each pair of channel members having overlapping joined flanges and webs facing one another and provided with grooves in the facing surfaces thereof, and a corrugated filler panel disposed between the webs of each pair of channel members and having flattened ridges thereon secured within said grooves, rungs interconnecting said side rails, said side rails having tubular members extending transversely therethrough and through said filler panels, said rungs being tubular and fitting over said tubular members and against said rails.

References Cited in the file of this patent

UNITED STATES PATENTS 1,045,957   Dicks _____ Dec. 3, 1912

(References on following page)

UNITED STATES PATENTS

| | | |
|---|---|---|
| 1,680,538 | Gross | Aug. 14, 1928 |
| 2,136,122 | Almdale | Nov. 8, 1938 |
| 2,392,552 | Roe | Jan. 8, 1946 |
| 2,417,586 | Crosley | Mar. 18, 1947 |
| 2,526,945 | Gray | Oct. 24, 1950 |
| 2,618,427 | Langley et al. | Nov. 18, 1952 |
| 2,707,694 | Standring | May 3, 1955 |

FOREIGN PATENTS

| | | |
|---|---|---|
| 793,579 | France | Jan. 27, 1936 |
| 1,030,991 | France | June 18, 1953 |